Aug. 21, 1962   J. C. BLACKETT   3,050,254
TIME DELAY AND ABNORMAL OPERATING CONDITION RESET CIRCUIT
Filed June 24, 1960
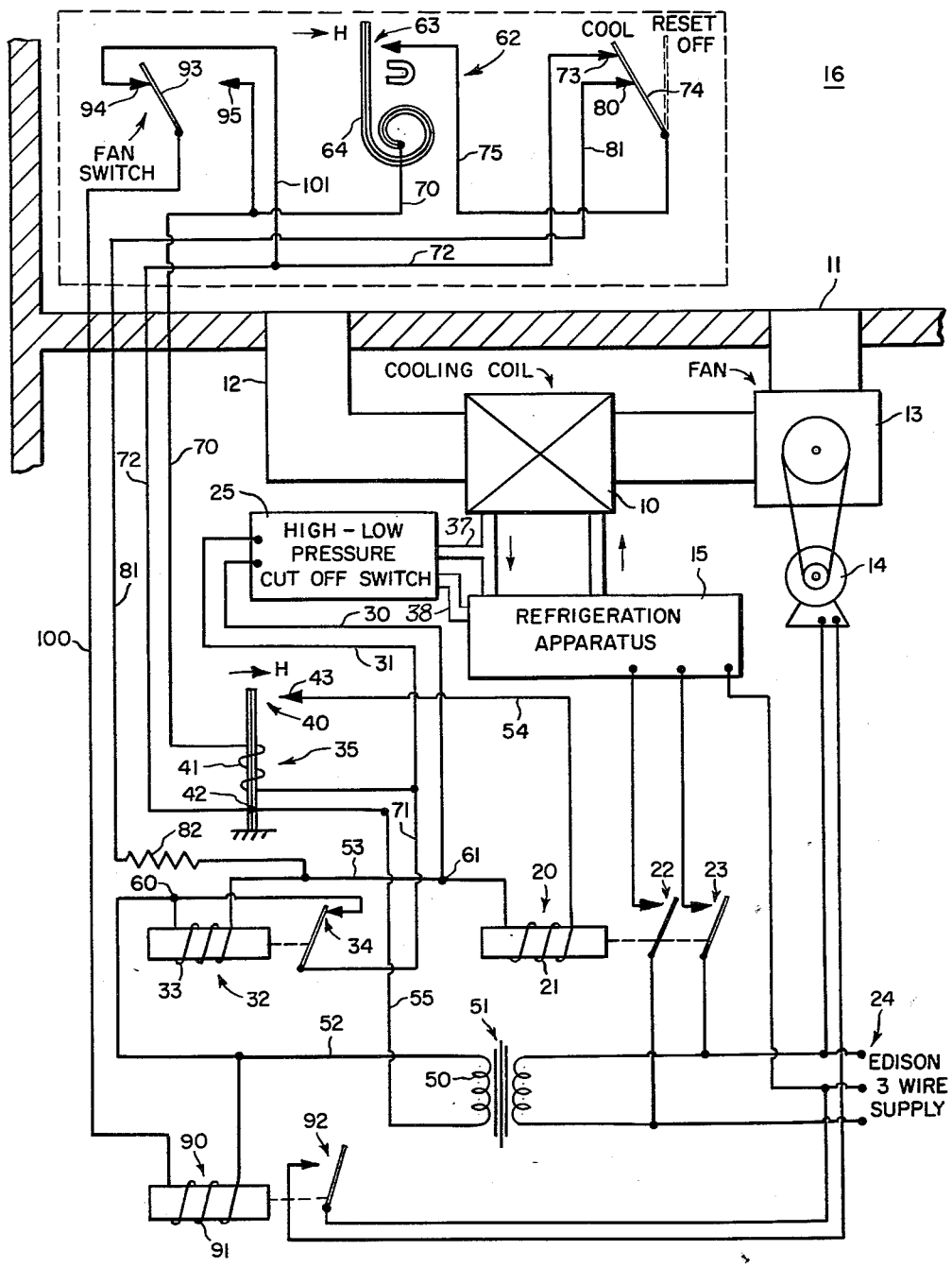
INVENTOR.
JAMES C. BLACKETT
BY *Clyde C. Blinn*
ATTORNEY United States Patent Office 3,050,254
Patented Aug. 21, 1962

3,050,254
TIME DELAY AND ABNORMAL OPERATING
CONDITION RESET CIRCUIT
James C. Blackett, Minneapolis, Minn., assignor to Minneapolis-Honeywell Regulator Company, Minneapolis, Minn., a corporation of Delaware
Filed June 24, 1960, Ser. No. 38,493
5 Claims. (Cl. 236—1)

The present invention is concerned with an improved control circuit for condition changing apparatus.

With the growing importance of residential air conditioning, numerous control systems have been devised for remotely resetting a control system having an abnormal condition responsive means after the system has been shut down due to the presence of an unsafe condition. One particular control system is commonly known as the "high impedance" reset circuit. The "high impedance" circuit has a relay winding in series with the main contactor winding with a normally closed abnormal condition responsive switch means shunting the relay winding. Upon the presence of an abnormal condition to effectively open the shunt circuit, the relay winding is placed in series with the contactor winding to reduce the current and cause the main control contactor to deenergize the associated air conditioning apparatus.

With the control of residential air condition apparatus directly from a space or room thermostat, another problem has resulted which affects the operating life of compressor type refrigeration apparatus. When refrigeration apparatus is deenergized, the reenergization of the compressor before a predetermined safe period has elapsed has been recognized as quite damaging. To overcome such adverse conditions, many compressor manufacturers have required that a time delay device be interposed between the thermostat and the compressor so a delay in the reenergization of the compressor is withheld once it is deenergized by opening the thermostat circuit.

When a residential air conditioning circuit is made up to provide the "high impedance" reset feature and the time delay feature, a number of requirements must be satisfied. Heretofore, circuits have been proposed which contain the features mentioned; however, various shortcomings were found to exist. For example, with the use of the time delay relay between the thermostat and the compressor, a marked disadvantage existss when the home owner must open a circuit to obtain the resetting action and wait any period for the resetting action to take place.

An object of the present invention is to provide an improved control apparatus for condition changing means.

Another object of the present invention is to provide an improved control circuit for air conditioning apparatus having remote reset and time delay action between a thermostat and the condition changing apparatus.

These and other objects of the present invention will become apparent upon a study of the following specification and drawing of which:

A single figure is a schematic diagram of the present invention as applied to air conditioning apparatus in a forced-air cooling installation.

Referring to the single figure, an air conditioning installation is shown. A cooling coil 10 is positioned in an air flow duct through which air flows from a return duct 11 to a supply duct 12 under the power of a fan 13. The fan is driven by a conventional motor 14. A cooling or refrigeration apparatus 15 is connected to a coil 10 to supply a cooling medium to the coil in a conventional system such as shown in the Newton Patent 2,214,700. A relay 20 has energization winding 21 and two normally open switches 22 and 23 which are connected to control the refrigeration apparatus. An Edison three-wire type power supply 24 is connected through switches 22 and 23 to the refrigeration apparatus. When relay 20 is energized, the refrigeration apparatus is placed in operation.

Associated with the refrigeration apparatus is an abnormal condition responsive switching device 25 which is shown as a conventional high-low, pressure, cutout switch similar to the type shown in the Kronmiller Patent 2,377,503. An open circuit is provided between conductors 30 and 31 by switch 25 whenever an abnormal condition takes place switch 25 is connected to the refrigeration system by conduits 37 and 38 to sense the low and high pressures, respectively. A relay 32 has a winding 33 and a normally closed switch 34. A time delay device 35 has a normally open switch 40 which closes after an actuator or energization winding 41 is connected to a source of power for a predetermined period of time. Switch 40 has terminals 42 and 43.

Relay 32, relay 20, and time delay device 35 are connected in series to a secondary winding 50 of a transformer 51 which is connected to power supply 24. A circuit is traced as follows: an upper terminal of secondary 50, a conductor 52, winding 33, conductor 53, winding 21, conductor 54, terminal 43, switch 40, terminal 42, and conductor 55 to the other terminal of secondary 50. Relays 32 and 20 are so designed to prevent simultaneous operation of the relays. When connected in series by the circuit traced, the current of the circuit is below the value necessary to maintain switches 22 and 23 of relay 20 closed. The high impedance of relay 32 cuts down the current so relay 20 cannot bring about energization of the refrigeration apparatus.

A shunt circuit is provided around winding 33. The shunt circuit is made up of a series connection of switch 34 and normally closed, abnormal, condition responsive switch 25. The shunt circuit is traced as follows: from terminal 60 at one end of winding 33, switch 34, conductor 31, switch 25, conductor 30, and back to terminal 61 which is connected between winding 33 and winding 21.

A thermostat 62 has a switch 63 which closes when a temperature responsive member or bimetal 64 is exposed to a temperature above some predetermined value. Switch 63 is connected to control the energization of winding 41 of the time delay device through a circuit traced as follows: from thermostat 62, conductor 70, winding 41, conductor 71, switch 34, terminal 60, secondary winding 50, conductor 55, terminal 42, conductor 72, contact 73, of a switch which is closed when movable member 74 is moved to the left, movable member 74, conductor 75, and back to switch 63. A second contact 80 is engaged by movable member 74 when in the left hand position. When the movable member is in the left hand position, as shown, a closed circuit exists between contacts 73 and 80. Contact 80 is connected by conductor 81 through a resistance 82 to conductor 53.

A fan control circuit for controlling fan motor 14 comprises a fan relay 90 which has an energization winding 91 and a normally open switch 92. Switch 92 is connected between power supply circuit 24 and motor 14 so motor 14 is energized when switch 92 is closed. A fan switch which might be mounted in the same housing as thermostat 62 has a movable member 93 adapted to engage either a fixed contact 94 or a fixed contact 95. As shown, with movable member 93 engaging contact 94, relay 90 is continuously energized to provide continuous operation of fan 13. The energization circuit is traced as follows: from winding 91, conductor 100, movable member 93, contact 94, conductor 101, conductor 72, terminal 42, conductor 55, secondary winding 50, and through conductor 52 back to winding 91. When movable member 93 is moved to the right to engage contact 95, the fan relay is energized as the thermostat 62 calls for cooling. The intermittent fan operation circuit is traced as follows: from winding 91, conductor 100, movable member 93, contact 95, conductor 70, switch 63, conductor 75, movable member 74, contact 73, conductor 72, terminal 42, conductor 55, secondary 50, and back through conductor 52 to winding 91.

*Operation*

Assuming electric power is available at power supply 24, the normal operation of the air conditioning system is as follows. With the fan switch, as shown, engaging contact 94, a continuous operation of the fan motor 14 is obtained, and air is circulated from the space in which thermostat 62 is located. As the air passes through the cooling coil 10, the cooling needs of the space are satisfied. Assuming that the temperature in the space 16 increases to a temperature at which thermostat switch 63 closes. With the cooling switch as shown, winding 41 of the time delay 35 is energized. After a predetermined time, such as 30 seconds, switch 40 closes to energize contactor or relay 20 to bring about operation of the refrigeration apparatus. When thermostat 62 is satisfied, switch 63 opens to deenergize the time delay relay, and after a predetermined time, switch 40 opens to deenergize the refrigeration apparatus.

Assuming that the thermostat 63 is calling for cooling, and the refrigeration apparatus is operating. Upon the presence of an abnormal condition in the cooling apparatus to cause switch 25 to open, the circuit between conductors 30 and 31 shunting winding 33 is broken to place winding 33 in series with winding 21 of the relay 20. The current of the circuit including windings 33 and 21 and switch 40 is reduced to a level below that necessary to maintain relay 20 energized. The refrigeration apparatus is then deenergized.

Immediately upon the energization of relay 32, switch 34 opens to open the circuit of the time delay device, and within a short time, switch 40 opens. A circuit including resistance 82 maintains energization of relay 32. The circuit has a current limitation which is selected by the value of resistance 82 to limit the current below that required to initially pull in relay 32; however, once relay 32 is energized by the circuit through relay 20, the circuit including resistance 82 maintains energization of relay 32.

As long as switch 34 is open, relay 20 will remain deenergized even though abnormal condition switch 25 closes. In order to restore operation of the refrigeration apparatus 15, relay 32 must be deenergized to reestablish the shunt circuit around winding 33 which provides a low impedance, energization circuit for relay 20.

The reset operation is established by moving movable member 74 to the "off" or "reset" position away from contacts 73 and 80. When the circuit between stationary contacts 73 and 80 is broken, relay 32 is deenergized and switch 34 closes to establish the low impedance energization circuit for relay 20. At the same time, switch 34 also completes the energization circuit for the time delay device 35, and if thermostat 62 is still calling for cooling, winding 41 is energized.

The importance of the separate circuit for the time delay relay 35 and the resetting operation of relay 32 should not be underestimated. Previous reset circuits of this type have had an inherent delay in the resetting operation after the reset switch or thermostat is moved to provide the open circuit. When the abnormal condition takes place in the present circuit, the time delay relay is immediately deenergized. After the time required for the delay to open switch 40 has elapsed, a normal resetting operation is provided by moving member 74 to the reset position. Normally, the home owner would not discover the presence of the fact that the air conditioning control system had developed an abnormal condition to require the resetting operation until the temperature of the space went up above the normal control temperature. When the home owner was aware of the increased temperature, the resetting operation could immediately take place by moving member 74 to the right to break the circuit between fixed contacts 73 and 80.

In the development of a circuit for air conditioning apparatus, many conditions must be met. One of the most adverse tests for such a circuit is the Underwriters Laboratories requirements. Circuits of this type previously used have had deficiencies when used with a fan relay. In the present circuit with the fan switch 93 engaging the fixed contact 95, fan operation exists when the thermostat calls for cooling. If an abnormal condition takes place with such a fan operation, the time delay relay would immediately be deenergized. If the abnormal condition disappeared before the time delay relay switch 40 opened and switch 25 closed, an energization circuit for the time delay relay exists through the fan relay winding 91. The circuit is traced as follows: from winding 91, conductor 100, member 93, contact 95, conductor 70, winding 41, conductor 71, a switch 34, relay winding 33, winding 21, conductor 54, switch 40, terminal 42, conductor 55, secondary 50, and back to the relay winding 91 through conductor 52. Under such a condition, the resetting action by moving member 74 to the right to open the circuit between contacts 73 and 80 would not be established; however, the time delay relay could only be maintained energized through the circuit including the fan relay as long as the thermostat 62 was not calling for cooling. As soon at the temperature of the space increased to cause the thermostat to close, switch 63 would shunt the time delay relay winding 41 to deenergize heater 41 and cause switch 40 to open by a circuit traced as follows: from winding 41, switch 25, resistance 82, contact 80, conductor 75, switch 63, conductor 70, and back to the time delay relay winding 41. Since the need for resetting would not be apparent as long as the temperature of the space was normal, the home owner would not sense the need of the operation of member 74 to provide the resetting action. As soon as thermostat 62 closed, the time delay relay would be deenergized and as soon as switch 40 opened the resetting action could be accomplished.

The present invention has been described as associated with air conditioning apparatus, and the intention is to limit the invention only by the scope of the appended claims in which I claim:

1. In a control circuit for controlling the energization of air conditioning apparatus having a fan, first relay means having an energization winding and a normally closed switch controlled by said winding, second relay means having an energization winding and being adapted to control the air conditioning apparatus, time delay means having a first electrical circuit means which closes after a predetermined period of energization of an energization circuit of said time delay means, a source of power, electrical circuit means connecting said first and second mentioned energization windings and said first circuit in series to said source of power, condition responsive switch means providing an open circuit upon the presence of an abnormal condition, electrical means connecting said normally closed switch and said condition responsive switch means in series to shunt said energization winding of said first relay means so that upon the presence of an abnormal condition said shunt circuit is broken to place said energization winding of said first relay means in series with said energization winding of said second relay means thereby reducing the current to a predetermined low value to cause said second relay means to deenergize said conditioning apparatus, space temperature responsive switch means, electrical circuit means connecting said temperature responsive switch means, said energization circuit of said time delay means, and said normally closed switch of said first relay means in a series circuit to said source of power to maintain said first circuit of said time delay means closed, circuit means comprising a remote switch for completing a circuit connecting said source of power and said energization winding of said first relay means to maintain energization of said first relay means after said first electrical circuit means is opened, third relay means adapted to control the fan, and circuit means comprising said temperature responsive switch means for connecting said third relay means to said source of power.

2. A control circuit for controlling the operation of an electric motor in an air condition apparatus, a source of power, first relay means having an energization winding and a normally closed switch actuated thereby, second relay means having an energization winding and being adapted to control the electric motor, a time delay means having an energization winding and a normally open switch actuated thereby, said normally open switch closing after a predetermined time of energization of said energization winding, electrical connection means connecting said normally open switch, said energization winding of said first relay means, and said energization winding of said second relay means in a series circuit to said source of power, abnormal condition responsive switch means providing an open circuit upon an abnormal condition affecting the motor being present, second electrical connection means connecting the series connection of said normally closed switch and said abnormal condition responsive switch means in parallel with said energization winding of said first relay means so that when said abnormal condition switch means opens said first relay means is energized, temperature responsive switch means responsive to space temperature, further electrical connection means connecting said temperature responsive switch means, said energization winding of said time delay relay, and said normally closed switch of said first relay means in series to said source of power, and another circuit for maintaining energization of said first relay means whereby said further electrical connection is ineffective to reenergize said time delay means even with said temperature responsive switch means closed.

3. In a control circuit for controlling the energization of air conditioning apparatus, first relay means having an energization winding and a normally closed switch controlled by said winding, second relay means having an energization winding and being adapted to control the conditioning apparatus, said second relay means requiring a larger current than said first relay means to maintain said relay energized, time delay means having an actuating means, said time delay means providing a closed circuit after a predetermined period of energization of said actuating means, a source of power, electrical circuit means connecting said first and second mentioned energization winding and said circuit of said time delay means in series to said source of power, air conditioning apparatus condition responsive switch means providing an open circuit upon the presence of an abnormal condition, electrical means connecting said normally closed switch and said condition responsive switch means in series to shunt said energization winding of said first relay means so that upon the presence of an abnormal condition said shunt circuit is broken to place said energization winding of said first relay means in series with said energization winding of said second relay means thereby reducing an energization current to a predetermined low value to cause said second relay means to deenergize said apparatus, said normally closed switch opening said shunt circuit to maintain energization of said first relay means even though said condition responsive switch means subsequently closes, electrical circuit means connecting said actuating means, and said normally closed switch in a series circuit to said source of power so that upon the energization of said first relay means said time delay means is deenergized.

4. In a resettable control circuit for controlling the energization of air conditioning apparatus, first relay means having an energization means and a normally closed switch controlled thereby, second relay means having an energization means and being adapted to control the conditioning apparatus, time delay means providing a circuit which is closed after a predetermined period of energization of an actuating means, a source of power, electrical circuit means connecting said first and second mentioned energization means and said circuit of said time delay means in series to said source of power, condition responsive switch means providing an open circuit upon the presence of an abnormal condition in the operation of the air conditioning apparatus, electrical means connecting said normally closed switch and said condition responsive switch means in a shunt circuit to shunt said energization means of said first relay means so that upon the presence of an abnormal condition said shunt circuit is broken to place said energization means of said first relay means in series with said energization means of said second relay means to reduce the current to a predetermined low value below the value required to maintain energization of said second relay means to effect deenergization of the conditioning apparatus, space temperature responsive switch means, and electrical circuit means connecting said temperature responsive switch means, actuating means of said time delay means, and said normally closed switch of said first relay means in a series circuit to said source of power to deenergize said time delay means when said first relay means is energized, and additional circuit means connecting said first relay means to said source of power, said adidtional circuit means and said time delay circuit must be open to deenergize said first relay means to reestablish operation of the air conditioning apparatus after said condition responsive switch means has opened and subsequently closed.

5. In a control circuit adapted to be remotely reset after being deenergized in a fail safe condition for controlling the energization of air conditioning apparatus, first relay means having an energization winding, second relay means having an energization winding and being adapted to control the air conditioning apparatus, time delay means providing a closed circuit upon energizing an actuating means a predetermined period and an open circuit after a predetermined period of deenergization after being closed, a source of power, electrical circuit means connecting said first and second mentioned energization winding in series to said source of power, abnormal condition responsive switch means providing an open circuit upon the presence of an abnormal condition in the operation of the apparatus, electrical means connecting said condition responsive switch means in parallel with said energization winding of said first relay means so that upon the presence of an abnormal condition said parallel circuit is broken to connect said energization winding of said first relay means to said source of power, circuit means for maintaining said winding of said first relay means energized even after said abnormal condition responsive switch means subsequently closes, means including said closed circuit of said time delay means for selectively energizing said second relay means, temperature responsive switch means, and electrical circuit means connecting said temperature responsive switch means, said actuating means of said time delay means, and said circuit means to said source of power so that upon said abnormal condition providing energization of said first relay means said actuating means is immediately deenergized even though said temperature responsive switch means is subsequently closed, and further circuit means for maintaining said first relay means energized, said further circuit means being effective even after said time delay means has been deenergized a predetermined period.

References Cited in the file of this patent

UNITED STATES PATENTS

| | | |
|---|---|---|
| 2,389,073 | Newton | Nov. 13, 1945 |
| 2,553,979 | Newton | May 22, 1951 |
| 2,898,746 | Mobarry | Aug. 11, 1959 |